(12) United States Patent
Righi et al.

(10) Patent No.: US 8,768,607 B2
(45) Date of Patent: Jul. 1, 2014

(54) MANAGING FUEL IN AIRCRAFT

(75) Inventors: Luigi Peter Righi, Laguna Hills, CA (US); Mark A. Talbot, Huntington Beach, CA (US); Gregory Mark Wellbrook, Long Beach, CA (US); John Lyttle, Huntington Beach, CA (US); Fred Austin, Gainesville, GA (US); Douglas Olie Nelson, Prospect, KY (US)

(73) Assignee: The Boeing Company, Chicago, IL (US)

( * ) Notice: Subject to any disclaimer, the term of this patent is extended or adjusted under 35 U.S.C. 154(b) by 692 days.

(21) Appl. No.: 12/886,943

(22) Filed: Sep. 21, 2010

(65) Prior Publication Data
US 2012/0072098 A1   Mar. 22, 2012

(51) Int. Cl.
G06F 19/00 (2011.01)
G06G 7/70 (2006.01)
G06G 7/76 (2006.01)

(52) U.S. Cl.
USPC ................................. 701/123; 701/1; 701/3

(58) Field of Classification Search
USPC ............... 701/1, 3, 4, 7, 15, 16, 99, 123, 423; 703/2
See application file for complete search history.

(56) References Cited

U.S. PATENT DOCUMENTS

| 4,312,041 | A | * | 1/1982 | DeJonge | 701/123 |
|---|---|---|---|---|---|
| 5,606,505 | A | * | 2/1997 | Smith et al. | 701/99 |
| 5,835,879 | A | * | 11/1998 | Bush | 701/123 |
| 7,356,336 | B2 | | 4/2008 | Perez et al. | |
| 7,606,641 | B2 | | 10/2009 | Allen | |
| 7,705,849 | B2 | | 4/2010 | Chen et al. | |
| 2005/0043934 | A1 | * | 2/2005 | Hartmann et al. | 703/2 |
| 2007/0032921 | A1 | * | 2/2007 | Allen | 701/3 |
| 2007/0032941 | A1 | * | 2/2007 | Allen | 701/123 |
| 2007/0118502 | A1 | * | 5/2007 | Aragones et al. | 707/2 |
| 2007/0150123 | A1 | * | 6/2007 | Combs | 701/3 |
| 2008/0250423 | A1 | * | 10/2008 | Bush et al. | 719/313 |
| 2010/0023201 | A1 | * | 1/2010 | Kinney et al. | 701/33 |
| 2011/0202208 | A1 | * | 8/2011 | Karnik et al. | 701/7 |

FOREIGN PATENT DOCUMENTS

| CA | 2549833 A1 | 9/2006 | |
|---|---|---|---|
| JP | 2004012235 A | * 1/2004 | G01C 21/00 |
| WO | 2006025845 A2 | 3/2006 | |
| WO | 2006025845 A3 | 3/2006 | |

* cited by examiner

Primary Examiner — Khoi Tran
Assistant Examiner — Jaime Figueroa
(74) Attorney, Agent, or Firm — Yee & Associates, P.C.

(57) ABSTRACT

A method and apparatus for managing aircraft. Data about components for the aircraft is identified. Fuel efficiency of the aircraft is identified using the data about the components for the aircraft and a model of the aircraft. The model of the aircraft identifies fuel use. The aircraft is managed using the fuel efficiency identified for the aircraft.

20 Claims, 7 Drawing Sheets

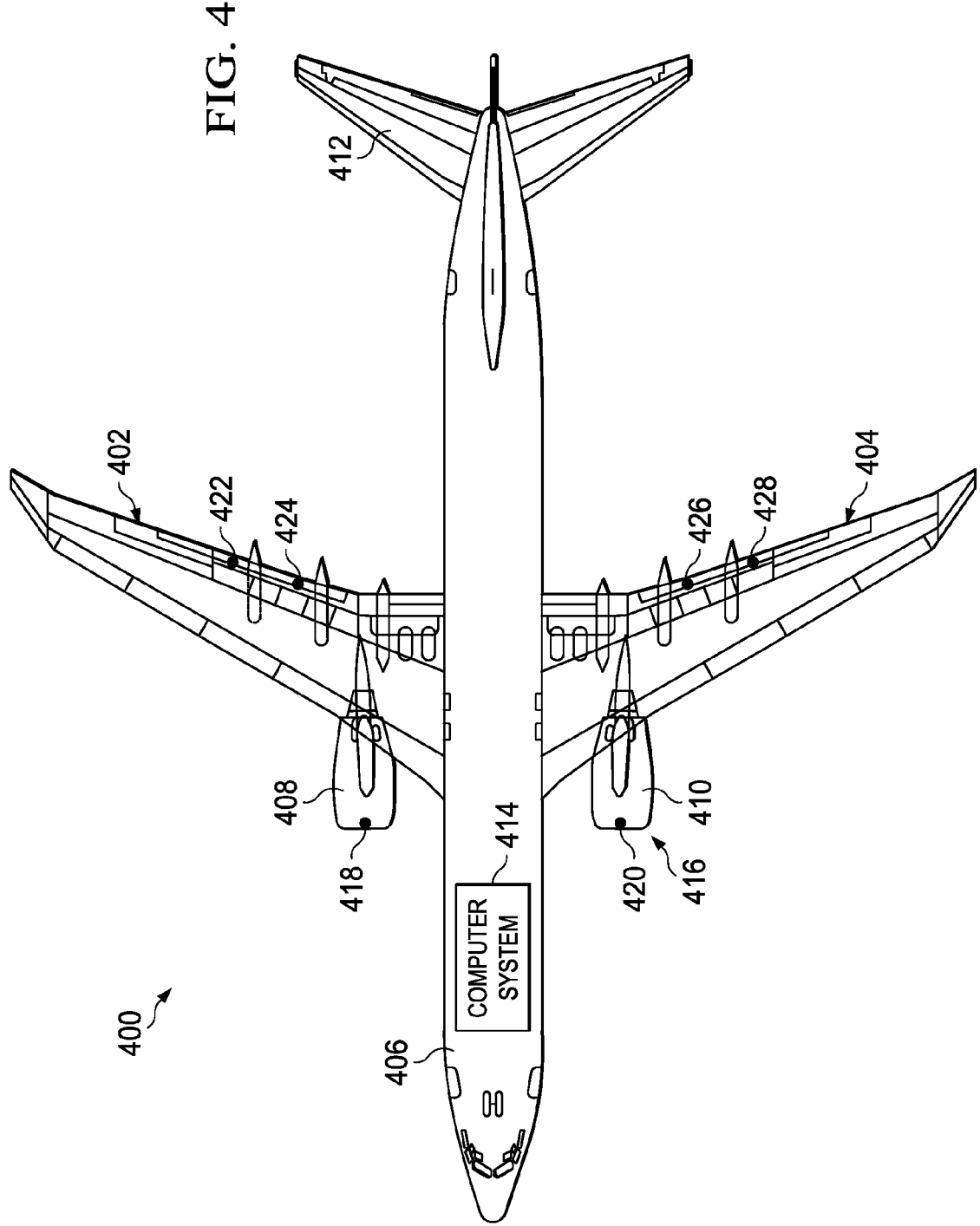

MANAGING FUEL IN AIRCRAFT

BACKGROUND INFORMATION

1. Field

The present disclosure relates generally to aircraft and, in particular, to a method and apparatus for managing aircraft. Still more particularly, the present disclosure relates to a method and apparatus for managing fuel for an aircraft.

2. Background

Aircraft are used for a number of different types of missions. For example, aircraft are used to carry passengers and/or cargo from one location to another location. Further, aircraft also may be used to perform surveillance. An aircraft may take pictures or video of a number of different locations.

In performing different missions, an aircraft is limited by the amount of fuel carried by the aircraft. The range of aircraft is limited by the maximum amount of fuel that the aircraft can carry. Further, the range at which an aircraft can fly between taking off and landing may also be affected by factors, such as the speed, environmental conditions, and other factors.

In planning a mission, the amount of fuel transferred to an aircraft may depend on the mission being flown. The amount of fuel may include, for example, the fuel needed to fly from a starting location to a landing location. The amount of fuel transferred to the aircraft typically includes a reserve amount in addition to the amount of fuel needed to fly from the starting location to the landing location. This reserve amount may take into account fuel needed for additional time required for taking off, landing, holding patterns, approaches, diversions, and other events. Oftentimes, the amount of fuel that is needed is less than the maximum capacity of the fuel tanks in the aircraft.

Placing more fuel than needed for a mission may be undesirable. When more fuel is transferred onto an aircraft than needed for a mission, the fuel efficiency of the aircraft may be reduced. The weight of the fuel also is taken into account in determining how much fuel is needed to perform a mission.

The fuel efficiency of an aircraft may be identified through a model for the aircraft. Each type of aircraft may have a model that provides a capability to identify how much fuel may be used by an aircraft at different speeds or altitudes. Determining the amount of fuel needed for a mission may not be as accurate as desired using the models of the aircraft.

Thus, placing more fuel than needed beyond desired safety factors may increase the cost for operating aircraft. Therefore, it would be advantageous to have a method and apparatus that takes into account one or more of the issues discussed above, as well as other possible issues.

SUMMARY

In one illustrative embodiment, a method is provided for managing aircraft. Data about components for the aircraft is identified. Fuel efficiency of the aircraft is identified using the data about the components for the aircraft and a model of the aircraft. The model of the aircraft identifies fuel use. The aircraft is managed using the fuel efficiency identified for the aircraft.

In another illustrative embodiment, an apparatus comprises a computer system and a process configured to run on the computer system. The process is configured to identify fuel efficiency of the aircraft using data about components for an aircraft and a model of the aircraft. The model of the aircraft identifies fuel use. The process is configured to manage the aircraft using the fuel efficiency identified for the aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

FIG. 4 is an illustration of an aircraft for which data may be identified in accordance with an illustrative embodiment;

DETAILED DESCRIPTION

Figure 1:
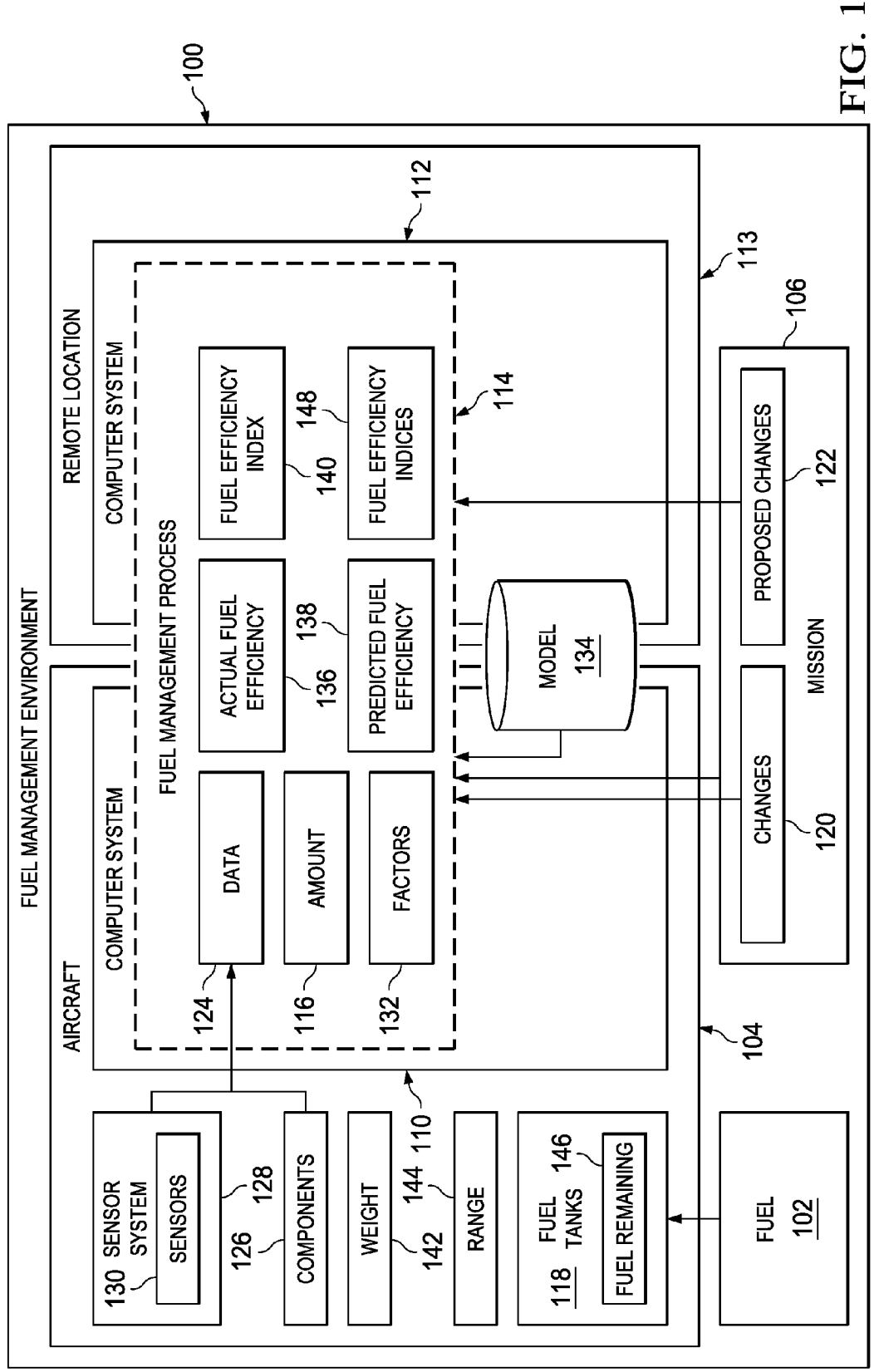
FIG. 1 is an illustration of a fuel management environment in accordance with an illustrative embodiment.

With reference now to the figures and, in particular, with reference to FIG. 1, an illustration of a fuel management environment is depicted in accordance with an illustrative embodiment. Fuel management environment 100 is an environment that may be used to manage fuel 102 for aircraft 104.

In these illustrative examples, aircraft 104 may take a number of different forms. For example, without limitation, aircraft 104 may be a passenger aircraft, an airplane, a helicopter, an unmanned aerial vehicle, a fighter jet, or some other suitable type of aircraft.

In these illustrative examples, fuel management environment 100 is an environment in which the management of fuel 102 for aircraft 104 may be performed for mission 106. Management of fuel 102 may occur in planning mission 106, performing mission 106, or a combination of the two.

In these illustrative examples, the management of fuel 102 may be performed using computer system 110 or computer system 112. Computer system 110 is located in aircraft 104 in these examples. Computer system 112 is located in remote location 113 from aircraft 104. For example, computer system 112 may be located at an airport, an office, or some other suitable location. In these illustrative examples, computer system 110 and computer system 112 may each be a number of computers. Each computer in computer system 110 and computer system 112 may be in communication with each other.

For example, computer system 110 may include a number of different types of computers. Computer system 110 may include, for example, without limitation, a flight management computer, an electronic flight bag, an aircraft flight control system, and/or other suitable types of computers and devices for operating aircraft 104.

As depicted, fuel management process 114 may run on at least one of computer system 110 and computer system 112 in these examples. Fuel management process 114 manages fuel 102 for aircraft 104.

The management of fuel 102 may take a number of different forms. For example, fuel management process 114 may identify amount 116 of fuel 102 to be transferred to fuel tanks 118 in aircraft 104. As another example, fuel management process 114 may identify amount 116 of fuel 102 left in fuel tanks 118 during mission 106. Also, fuel management process 114 may be used to identify amount 116 of fuel 102 needed to perform mission 106 while mission 106 is being performed.

Additionally, fuel management process 114 also may be used to identify an impact of changes 120 during the performance of mission 106 and how changes 120 impact or affect fuel 102. In particular, fuel management process 114 may be used to determine whether changes 120 affect the use of fuel 102 in a manner that allows for the completion of mission 106 or requires changes to mission 106.

Changes 120 may include changes that actually have been made to mission 106. These changes include, for example, without limitation, changes to airspeed, a destination, an altitude, weather, cargo, and/or other factors during the performance of mission 106.

Further, fuel management process 114 also may be used to identify whether proposed changes 122 to mission 106 affect fuel 102 in a manner that will allow for completion of mission 106. Proposed changes 122 may be, for example, without limitation, a change in airspeed, an addition of a destination to mission 106, a change of a destination to mission 106, and/or other suitable types of changes.

In these illustrative examples, fuel management process 114 uses data 124 about components 126 in aircraft 104. Components 126 may include a number of different components in these examples. Components 126 may include, for example, without limitation, an engine, a body, a flight control surface, such as a flap or a wing, and/or other suitable types of components in aircraft 104. In these illustrative examples, data 124 may be identified in a number of different ways. For example, data 124 may be obtained from computer system 110 in aircraft 104 and/or sensor system 128.

Sensor system 128 comprises sensors 130 associated with aircraft 104. These sensors may include, for example, without limitation, an air pressure sensor, a yaw rate sensor, a pitch rate sensor, a temperature sensor, an inertial navigation system, a global positioning satellite system, and/or other suitable types of sensors. Sensors 130 are configured to generate data 124 about components 126.

Fuel management process 114 uses data 124 to identify factors 132 without affecting use of fuel 102 by components 126. In these illustrative examples, fuel management process 114 compares factors 132 identified for aircraft 104 to model 134. Model 134 is a model for aircraft 104. Model 134 is used to identify use of fuel 102 for all aircraft of the same type as aircraft 104. In these illustrative examples, factors 132 are based on actual usage of fuel 102 identified from data 124.

In other words, data 124 is used by fuel management process 114 to identify actual fuel efficiency 136 for aircraft 104. Actual fuel efficiency 136 is identified in substantially real-time and is continuously updated in these illustrative examples.

Actual fuel efficiency 136 is compared to predicted fuel efficiency 138. In these examples, predicted fuel efficiency 138 is identified using model 134. This comparison of actual fuel efficiency 136 to predicted fuel efficiency 138 is used by fuel management process 114 to generate fuel efficiency index 140. Fuel efficiency index 140 is generated in substantially real-time and is continuously updated in these examples. In other words, fuel efficiency index 140 is continuously generated to continuously indicate whether actual fuel efficiency 136 is better, about the same, or worse than predicted fuel efficiency 138.

In this manner, fuel management process 114 may be used to generate more accurate information for usage of fuel 102 for mission 106 by aircraft 104. Also, planning may be made for mission 106 ahead of time to determine amount 116 of fuel 102 that may be needed to perform mission 106. Amount 116 may be based on actual fuel efficiency 136, rather than predicted fuel efficiency 138.

For example, if actual fuel efficiency 136 is better than predicted fuel efficiency 138 for mission 106, then a lesser amount of fuel 102 may be needed and, as a result, loaded into aircraft 104, as compared to the amount of fuel 102 that may be needed when predicted fuel efficiency 138 is used. In this manner, with less fuel, weight 142 of aircraft 104 may be reduced during mission 106. Reduction of weight 142 may be used to increase fuel efficiency of aircraft 104. When less fuel is present, weight 142 decreases. The reduction of weight 142 decreases amount 116 of fuel 102 needed to perform mission 106. In this manner, performance of mission 106 may be increased and have a reduced cost.

Additionally, in planning mission 106, range 144 of aircraft 104 may be increased if actual fuel efficiency 136 is better than predicted fuel efficiency 138. As a result, the increase of range 144 may be taken into account when planning mission 106.

Further, actual fuel efficiency 136 may change dynamically during the performance of mission 106. In other words, actual fuel efficiency 136 may change as mission 106 occurs. Changes to actual fuel efficiency 136 are identified through data 124. For example, changes in weather, altitude, airspeed, destinations, and/or other parameters may change actual fuel efficiency 136 for aircraft 104.

Based on this identification of changes to actual fuel efficiency 136, operators of aircraft 104 may make decisions as to whether mission 106 may be completed, whether a request to change mission 106 can be performed, and whether other suitable operations should be performed.

Further, fuel management process 114 may present actual fuel efficiency 136 and an indication of other information, such as range 144 and fuel remaining 146 for aircraft 104. In this manner, operators of aircraft 104 may monitor use of fuel 102 during mission 106 and determine whether mission 106 can be completed as the situation of the mission changes and/or whether changes to mission 106 may be needed.

In the different illustrative examples, actual fuel efficiency 136 is identified for aircraft 104. Actual fuel efficiency 136 may also be identified for components 126 in these examples. For example, while actual fuel efficiency 136 for aircraft 104 is identified using fuel efficiency index 140 for aircraft 104, actual fuel efficiency 136 for components 126 may be identified using fuel efficiency indices 148 for components 126. In this manner, actual fuel efficiency 136 for components 126 in aircraft 104 is identified independently from actual fuel efficiency 136 for aircraft 104.

As one illustrative example, an efficiency index for the body of aircraft 104 may be identified based on the drag on the body of aircraft 104. As another example, an efficiency index may be generated for each engine in aircraft 104. The efficiency index generated for aircraft 104 may take into account a number of different factors. These factors may include, for example, without limitation, a configuration of surfaces for aircraft 104, the type of mission 106, and/or individual pilot style of operation. These surfaces may include, for example, doors, landing gear, control surfaces, and/or other suitable surfaces that may affect the drag on aircraft 104.

The illustration of fuel management environment 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, computer system 112 may be used to manage fuel for other aircraft in addition to aircraft 104. In still other illustrative embodiments, fuel efficiency index 140 may be used to identify when maintenance may be needed for aircraft 104. Particularly, when fuel efficiency indices 148 are identified for components 126 in aircraft 104, changes to one or more of fuel efficiency indices 148 may be used to identify when maintenance may be needed for one or more components in components 126 for aircraft 104.

Figure 2:
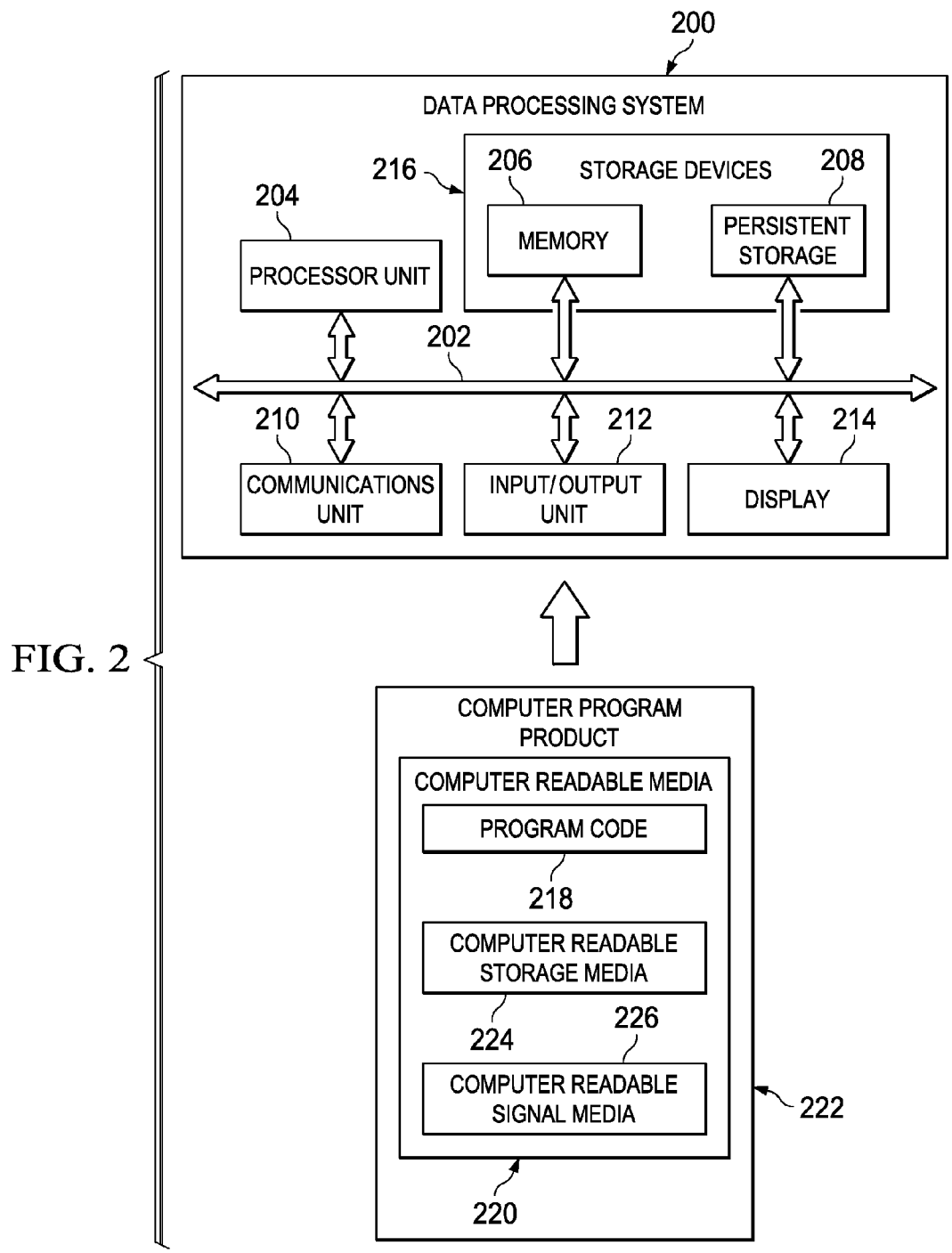
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 is an example of one manner in which computer system 110 and/or computer system 112 in FIG. 1 may be implemented. As depicted, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
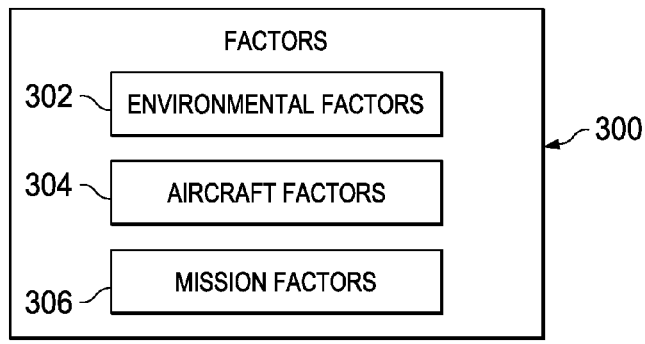
FIG. 3 is an illustration of factors in accordance with an illustrative embodiment.

With reference now to FIG. 3, an illustration of factors is depicted in accordance with an illustrative embodiment. In this illustrative example, factors 300 are examples of one implementation for factors 132 in FIG. 1. In this illustrative example, factors 300 include environmental factors 302, aircraft factors 304, and mission factors 306. Of course, other types of factors may be included in factors 300, depending on the particular implementation.

In this depicted example, environmental factors 302 include, for example, without limitation, wind, humidity, temperature, turbulence, pressure, weather, and/or other suitable environmental factors. Aircraft factors 304 include, for example, without limitation, amount of fuel, amount of payload, configuration of the surface of the aircraft, drag of the aircraft, condition of the surface of the aircraft, engine performance, and/or other suitable factors relating to the aircraft.

Mission factors 306 include, for example, without limitation, altitudes for a mission, maneuvers to be performed, speed of the aircraft, and/or other suitable factors. The mission factors may include changes in speed during the mission, as well as changes in altitude. These different factors are taken into account when identifying the fuel efficiency index for the aircraft.

In these illustrative examples, the configuration of the surface of the aircraft may change the drag of the aircraft. For example, a deployment of flaps, engine breaks, and/or other components may cause changes in fuel efficiency for the aircraft. Further, whether the aircraft has been cleaned may affect the drag on the surface of the aircraft.

With reference now to FIG. 4, an illustration of an aircraft for which data may be identified is depicted in accordance with an illustrative embodiment. In this illustrative example, aircraft 400 is an example of one implementation for aircraft 104 in FIG. 1. In this illustrative example, aircraft 400 has wings 402 and 404 attached to body 406. Aircraft 400 includes engine 408, engine 410, and tail 412.

Aircraft 400 also includes computer system 414. In other illustrative examples, computer system 414 may be located in a location remote to aircraft 400. Computer system 414 is configured to receive data from a number of sources. For example, computer system 414 is configured to receive data from sensor system 416. Sensor system 416 may include sensors, such as, for example, without limitation, sensor 418 and sensor 420. Sensor 418 and sensor 420 are configured to generate engine performance data for engine 408 and engine 410, respectively.

Further, sensor system 416 may also include sensors 422, 424, 426, and 428. Sensors 422, 424, 426, and 428 are configured to generate load data for aircraft 400. Still further, sensor system 416 may include other sensors in addition to the ones described. These sensors may include, for example, without limitation, an air pressure sensor, a temperature sensor, a yaw rate sensor, a pitch rate sensor, a temperature sensor, an inertial navigation system, a global positioning satellite system, and/or other suitable types of sensors.

The different sensors for sensor system 416 are configured to generate signals that can be monitored and/or recorded by computer system 414. Further, aircraft 400 may also have electrical and/or electromechanical actuators configured to generate signals that can be monitored and/or recorded by computer system 414.

Still further, computer system 414 is configured to receive data about other components in aircraft 400 from modules, such as line replaceable units, configured to monitor these other components. These other components may include, for example, without limitation, actuators, valves, a motor, the pilot's yoke, and/or other suitable types of components. For example, a line replaceable unit monitoring the yoke may be configured to generate signals indicating the directions in which the pilot maneuvers aircraft 400.

The signals generated by the different components in aircraft 400 and/or the modules monitoring components in aircraft 400 may be received onto a number of buses and packaged as data. The data may be stored in memory in some cases. Computer system 414 is configured to receive this data from the number of buses and/or from memory.

Additionally, computer system 414 is configured to receive data from sources outside of aircraft 400. For example, computer system 414 may receive weather data from a weather service and/or environmental data from a ground station. The weather data and environmental data may include, for example, data about wind, humidity, temperature, turbulence, lightning, rain, other weather conditions, and/or other suitable types of data.

Further, computer system 414 may also obtain data containing a mission profile for aircraft 400, a weight of aircraft 400, a configuration for aircraft 400, and/or other suitable types of data about aircraft 400.

In this illustrative example, computer system 414 may process the data received from sensor system 416 and/or other suitable types of data to manage aircraft 400. In particular, computer system 414 may use the data and/or a model of aircraft 400 to identify fuel efficiency for aircraft 400.

Figure 5:
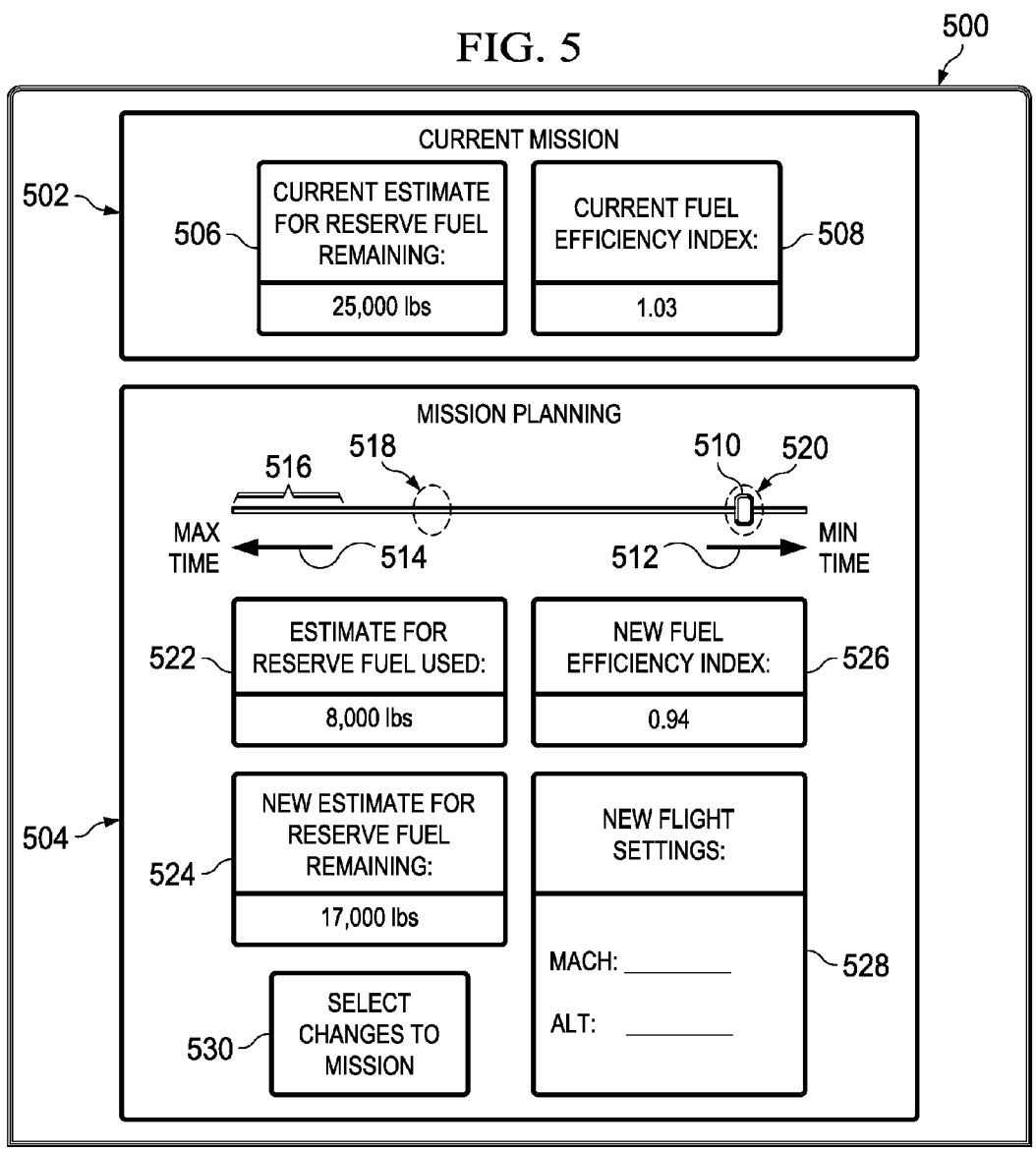
FIG. 5 is an illustration of a graphical user interface for an aircraft that may be used to present information for planning a mission in accordance with an illustrative embodiment.

With reference now to FIG. 5, an illustration of a graphical user interface for an aircraft that may be used to present information for planning a mission is depicted in accordance with an illustrative embodiment. In this illustrative example, graphical user interface 500 displays information for current mission 502 and information for mission planning 504.

As depicted, graphical user interface 500 displays current estimate for reserve fuel remaining 506 and current fuel efficiency index 508. Current estimate for reserve fuel remaining 506 presents the amount of fuel estimated to be remaining in reserve at the end of the mission. Current fuel efficiency index 508 presents the current fuel efficiency index for the current mission for the aircraft.

In this illustrative example, an operator of the aircraft, such as a pilot, may use mission planning 504 to select a change to a parameter of fuel usage to change the mission. The parameter of fuel usage, in these examples, is a length of time for completing the mission for the aircraft.

For example, the pilot of the aircraft may move slider 510 to change the length of time for completing the mission to a desired length of time. For example, an event may occur during the mission requiring that the mission be completed within a shorter amount of time than the current amount of time allotted for the mission. The event may be, for example, a change in weather conditions along the route for the mission, a medical emergency, and/or some other suitable type of event.

As slider 510 is moved in the direction of arrow 512, the length of time for completing the mission is decreased. The length of time may be decreased to a minimum time for completing the mission. The minimum time is the least amount of time required for completing the mission. The minimum time is based on a number of factors including, without limitation, maximum speed for the aircraft, weather conditions, restricted airspace, and/or other suitable factors.

As slider 510 is moved in the direction of arrow 514, the length of time for completing the mission is increased. The length of time may be increased up to a maximum time for completing the mission. The maximum time may be an indefinite amount of time in this illustrative example. In other words, the maximum time may be undefined and have no limit. In other illustrative examples, the maximum time may be the time in which the mission is required to be completed.

In this illustrative example, a change from the current length of time for the mission to the desired length of time using slider 510 may change the amount of reserve fuel remaining at the end of the mission and the fuel efficiency index. However, in this depicted example, when slider 510 is moved to a position within area 516, the effect of the corresponding lengths of time for the mission on remaining reserve fuel and/or the fuel efficiency index may be substantially absent.

As one illustrative example, the pilot may move slider 510 from position 518 to position 520. Position 518 corresponds to the current length of time needed to complete the mission for the aircraft. Position 520 corresponds to the desired length of time to complete the mission for the aircraft.

When slider 510 is moved to position 520, graphical user interface 500 displays estimate for reserve fuel used 522, new estimate for reserve fuel remaining 524, new fuel efficiency index 526, and new flight settings 528. Estimate for reserve fuel used 522 presents the amount of fuel in reserve that is expected to be used during the mission if the time for the mission is changed to the desired length of time.

In this illustrative example, new estimate for reserve fuel remaining 524 presents the amount of fuel estimated to be in reserve at the end of the mission based on the desired length of time and the amount of reserve fuel estimated to be used with the desired length of time for the mission. New fuel efficiency index 526 presents the fuel efficiency index for the aircraft based on the change to the desired length of time for the mission.

Further, new flight settings 528 present new values for different flight settings based on the change to the desired length of time for the mission. If the change to the desired length of time is not possible for the mission, an error message may be presented in new flight settings 528.

In this depicted example, estimate for reserve fuel used 522, new estimate for reserve fuel remaining 524, new fuel efficiency index 526, and new flight settings 528 change as slider 510 is moved. Based on the information presented in mission planning 504, the pilot selects a desired length of time for the mission.

The pilot may then select control button 530. Selection of control button 530 selects the changes to the mission. In particular, selection of control button 530 selects the desired length of time identified based on the position of slider 510 for the mission.

Additionally, in this illustrative example, selection of control button 530 initiates an automated process for changing the flight settings for the aircraft. In some illustrative examples, the pilot may need to manually change the flight settings for the aircraft based on the information presented in new flight settings 528.

In some illustrative examples, the fuel remaining displayed in current mission 502 may be all of the fuel carried by the aircraft rather than just the reserved fuel amount.

Figure 6:
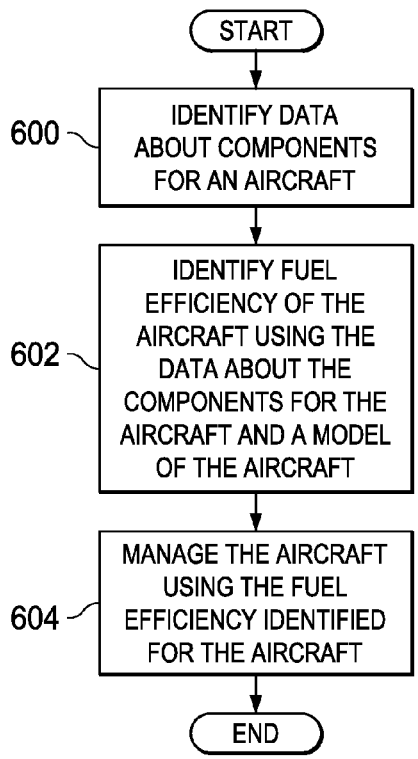
FIG. 6 is an illustration of a flowchart of a process for managing an aircraft in accordance with an illustrative embodiment.

With reference now to FIG. 6, an illustration of a flowchart of a process for managing an aircraft is depicted in accordance with an illustrative embodiment. The process illustrated in FIG. 6 may be implemented using fuel management process 114 running on computer system 110 in aircraft 104 and/or computer system 112 in remote location 113 in fuel management environment 100 in FIG. 1.

The process begins by identifying data about components for an aircraft (operation 600). The components for the aircraft may include, for example, an engine, a flap, a body of the aircraft, and/or other suitable components. The process then identifies fuel efficiency of the aircraft using the data about the components for the aircraft and a model of the aircraft (operation 602). The model of the aircraft identifies fuel use.

Thereafter, the process manages the aircraft using the fuel efficiency identified for the aircraft (operation 604), with the process terminating thereafter.

Figure 7:
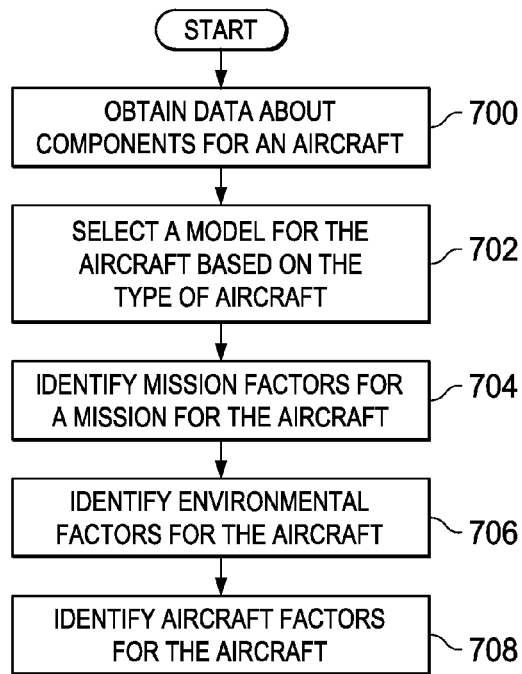
FIG. 7 is an illustration of a flowchart of a process for identifying fuel efficiency for an aircraft in accordance with an illustrative embodiment.

With reference now to FIG. 7, an illustration of a flowchart of a process for identifying fuel efficiency for an aircraft is depicted in accordance with an illustrative embodiment. The process illustrated in FIG. 7 may be implemented using, for example, fuel management process 114 running on computer system 110 in aircraft 104 and/or computer system 112 in remote location 113 in fuel management environment 100 in FIG. 1.

The process begins by obtaining data about components for an aircraft (operation 700). In operation 700, the data obtained may include an identification of a tail number for the aircraft. The data received in operation 700 may be obtained by receiving the data from a sensor system in the aircraft, from the computer system in the aircraft, and/or from other sources.

The process then selects a model for the aircraft based on the type of aircraft (operation 702). The model is a model for the aircraft that identifies fuel use for the aircraft. In operation 702, when the process is running on computer system 112 in remote location 113, the process selects the model for the aircraft using the identification of the tail number as provided in the data received in operation 700.

The process then identifies mission factors for a mission for the aircraft (operation 704). The mission factors may include, for example, without limitation, a speed for the aircraft, altitudes to be reached for the aircraft, maneuvers to be performed, waypoints to be reached during the mission, and/or other suitable factors.

Next, the process identifies environmental factors for the aircraft (operation 706). The environmental factors may include, for example, wind, humidity, temperature, turbulence, and/or other suitable types of environmental factors. Thereafter, the process identifies aircraft factors for the aircraft (operation 708). The aircraft factors may include, for example, a fuel capacity for the aircraft, fuel in reserve for the aircraft, a payload for the aircraft, a surface configuration for the aircraft, and/or other suitable types of factors.

The process then uses the data about the components, the model of the aircraft, the mission factors, the environmental factors, and the aircraft factors to identify a fuel efficiency for the aircraft with respect to the mission for the aircraft (operation 710), with the process terminating thereafter. The fuel efficiency identified for the aircraft is the actual fuel efficiency of the aircraft as compared to a predicted fuel efficiency that is identified using the model of the aircraft.

Further, in operation 710, in identifying the actual fuel efficiency for the aircraft, a fuel efficiency index for the aircraft and/or fuel efficiency indices for the components in the aircraft are identified. The fuel efficiency indices identified may be greater than, equal to, or less than the predicted fuel efficiency indices for the aircraft.

The process illustrated in FIG. 7 may be performed prior to flight and/or during flight any number of times.

Figure 8:
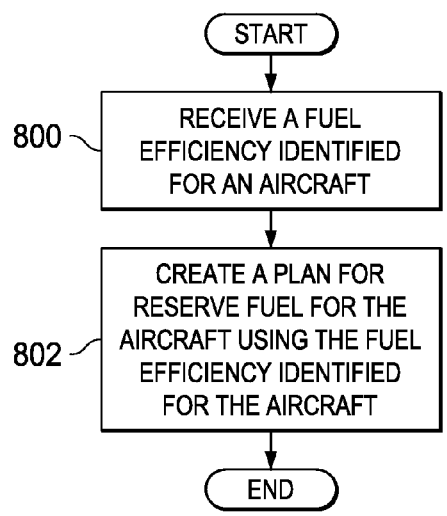
FIG. 8 is an illustration of a flowchart of a process for planning reserve fuel for an aircraft in accordance with an illustrative embodiment.

With reference now to FIG. 8, an illustration of a flowchart of a process for planning reserve fuel for an aircraft is depicted in accordance with an illustrative embodiment. The process illustrated in FIG. 8 may be implemented using fuel management process 114 in FIG. 1 running on computer system 112 in remote location 113 in fuel management environment 100 in FIG. 1.

The process begins by receiving a fuel efficiency identified for an aircraft (operation 800). In operation 800, the fuel efficiency identified for the aircraft may be the fuel efficiency identified using the process illustrated in FIG. 7. The identified fuel efficiency may be received from the fuel management process running on a computer system located in the aircraft. In particular, the computer system in the aircraft may send the fuel efficiency identified for the aircraft to the computer system located remotely using a wireless communications link.

Thereafter, the process creates a plan for reserve fuel for the aircraft using the fuel efficiency identified for the aircraft (operation 802), with the process terminating thereafter. The plan for reserve fuel may be an identification of an amount of fuel to transfer into the fuel tanks for the aircraft based on the mission for the aircraft.

Figure 9:
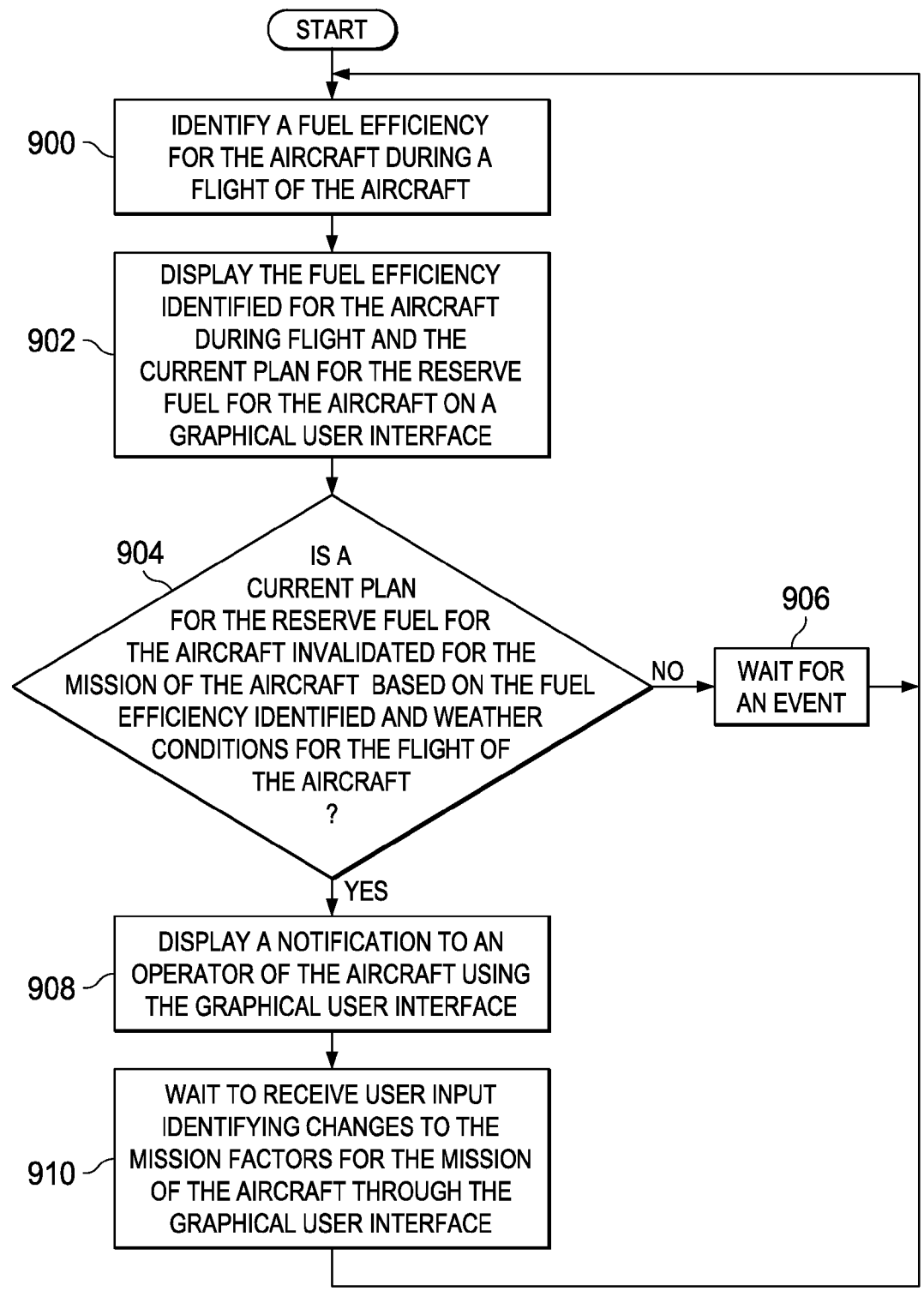
FIG. 9 is an illustration of a flowchart of a process for managing a plan for reserve fuel for an aircraft in accordance with an illustrative embodiment.

With reference now to FIG. 9, an illustration of a flowchart of a process for managing a plan for reserve fuel for an aircraft is depicted in accordance with an illustrative embodiment. The process illustrated in FIG. 9 may be implemented using fuel management process 114 running on computer system 110 in aircraft 104 in fuel management environment 100 in FIG. 1.

The process begins by identifying a fuel efficiency for the aircraft during a flight of the aircraft (operation 900). In operation 900, the fuel efficiency for the aircraft may be identified using the process illustrated in FIG. 7.

The process then displays the fuel efficiency identified for the aircraft during flight and the current plan for the reserve fuel for the aircraft on a graphical user interface (operation 902). Thereafter, the process determines whether a current plan for the reserve fuel for the aircraft is invalidated for the mission of the aircraft based on the fuel efficiency identified and weather conditions for the flight of the aircraft (operation 904). The current plan for the reserve fuel may be the plan created using the process illustrated in FIG. 8.

If the current plan for the reserve fuel for the aircraft is still valid, the process waits for an event (operation 906). The event may be, for example, without limitation, a periodic event and/or a non-periodic event. The periodic event may be, for example, the lapse of a timer. The non-periodic event may be, for example, receiving user input. In response to the event occurring, the process returns to operation 900 as described above.

If the current plan for the reserve fuel for the aircraft is invalidated, the process displays a notification to an operator of the aircraft using the graphical user interface (operation 908). The process then waits to receive user input identifying changes to the mission factors for the mission of the aircraft through the graphical user interface (operation 910).

In operation 910, changes to the mission factors for the mission may include, for example, without limitation, changing a number of waypoints reached by the aircraft, changing a destination for the flight, changing an altitude for the aircraft, changing a speed of the aircraft, and/or other suitable types of changes.

In response to receiving the user input identifying the changes to the mission factors for the mission of the aircraft, the process proceeds to operation 900 as described above. In this manner, the fuel efficiency for the aircraft may be reidentified based on the changes to the mission for the aircraft.

Figure 10:
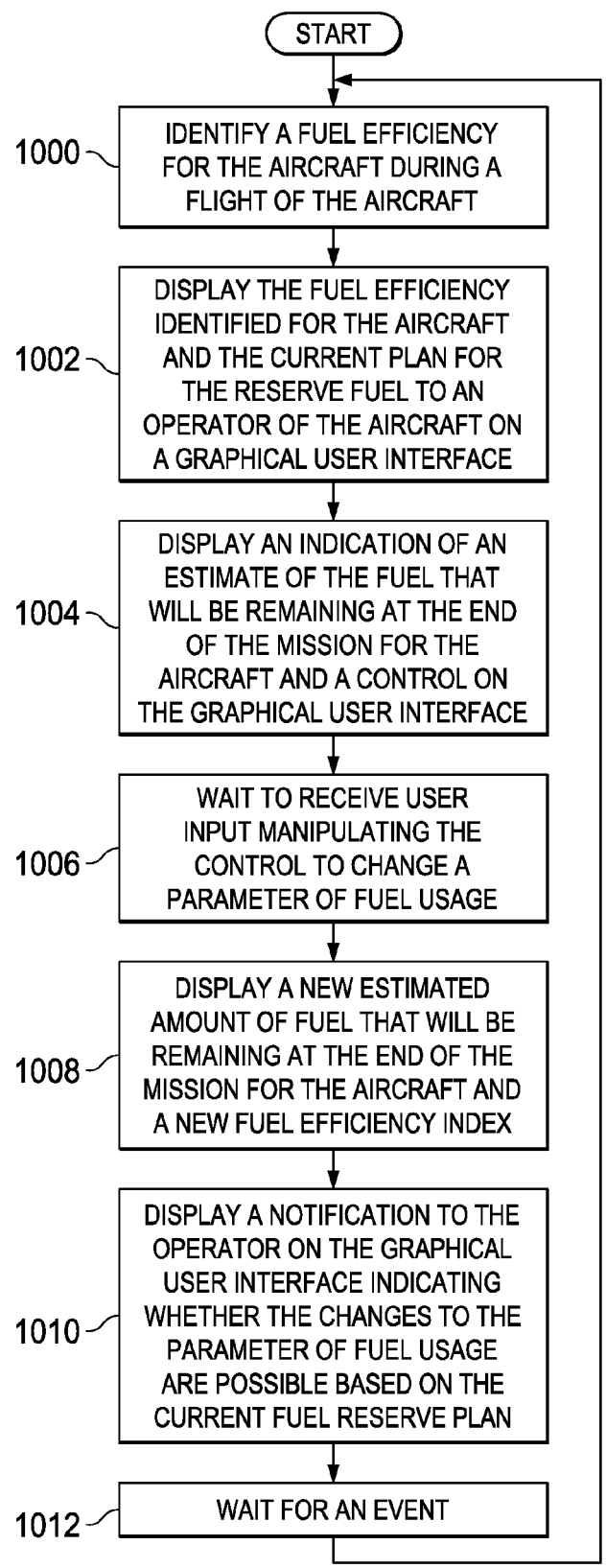
FIG. 10 is an illustration of a flowchart of a process for managing a plan for reserve fuel in an aircraft in accordance with an illustrative embodiment.

With reference now to FIG. 10, an illustration of a flowchart of a process for managing a plan for reserve fuel in an aircraft is depicted in accordance with an illustrative embodiment. The process illustrated in FIG. 10 may be implemented using fuel management process 114 running on computer system 110 in aircraft 104 in fuel management environment 100 in FIG. 1.

The process begins by identifying fuel efficiency for an aircraft during flight (operation 1000). Operation 1000 may be performed using the process illustrated in FIG. 7. The process then displays the fuel efficiency identified for the aircraft and a current plan for the reserve fuel to an operator of the aircraft on a graphical user interface (operation 1002).

The process displays an indication of an estimate of the fuel that will be remaining at the end of the mission for the aircraft and a control on the graphical user interface (operation 1004). The control may be, for example, a graphical slider that may be manipulated using user input.

Next, the process waits to receive user input manipulating the control to change a parameter of fuel usage (operation 1006). The parameter of fuel usage relates to the speed of the aircraft.

For example, a graphical slider may be manipulated in one manner to indicate a decrease in speed, which, in turn, may increase fuel efficiency. The graphical slider may also be manipulated in another manner to indicate an increase in speed, which, in turn, may decrease fuel efficiency. The operator of the aircraft may manipulate the slider to determine how changes to the speed of the aircraft may affect the amount of fuel remaining in reserve if changes to the mission are made.

In response to receiving the user input manipulating the control to change the parameter for fuel usage, the process displays a new estimated amount of fuel that will be remaining at the end of the mission for the aircraft and a new fuel efficiency index (operation 1008). The process displays a notification to the operator on the graphical user interface indicating whether the changes to the parameter of fuel usage are possible based on the current fuel reserve plan (operation 1010). In operation 1010, this notification may include, for example, changes to values for flight settings that need to be made based on the changes to the parameter of fuel usage. Further, this notification may include an error message when the changes are not possible.

Thereafter, the process waits for an event (operation 1012). The event may be, for example, user input identifying changes to the mission for the aircraft based on the changes to the parameter of fuel usage. The event may be, for example, the lapse of a timer. In response to the event occurring, the process returns to operation 1000 as described above.

The different illustrative embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing an aircraft, the method comprising:
   identifying, using a computer system, data about components for the aircraft during a mission;
   identifying, using the computer system, responsive to an event during the mission, an actual fuel efficiency of the aircraft during the mission by adjusting a model for the aircraft based upon the data about the components for the aircraft such that the model identifies predicted fuel use, and the actual fuel efficiency is substantially continuously updated in real-time; and
   managing, using the computer system, the aircraft during the mission using the fuel efficiency.

2. The method of claim 1, wherein the step of managing the aircraft comprises:
   identifying an amount of fuel needed by the aircraft for the mission.

3. The method of claim 2, wherein the step of managing the aircraft further comprises:
   transferring the amount of fuel identified as being needed by the aircraft for the mission into a number of fuel tanks in the aircraft.

4. The method of claim 1, wherein the step of managing the aircraft comprises:
   displaying an estimate of fuel left during flight of the aircraft using the actual fuel efficiency identified for the aircraft.

5. The method of claim 1, wherein the step of managing the aircraft comprises:
   displaying an indication of whether a change to the mission is needed based on an estimate of fuel left and an estimate of fuel usage based on the actual fuel efficiency of the aircraft.

6. The method of claim 1, wherein the step of managing the aircraft using the actual fuel efficiency identified for the aircraft comprises:
   displaying an indication of an estimate of fuel remaining at an end of the mission and a control on a graphical user interface on a display device; and responsive to receiving an input manipulating the control to change a parameter for fuel usage, identifying a new estimated amount of fuel remaining at the end of the mission.

7. The method of claim 6, wherein the parameter for fuel usage is selected from a group comprising airspeed and altitude.

8. The method of claim 1, wherein the step of identifying the data about the components for the aircraft comprises:
identifying the data about the components for the aircraft during flight of the aircraft; and
wherein the step of identifying the actual fuel efficiency of the aircraft using the data about the components for the aircraft and the model of the aircraft, wherein the model of the aircraft identifies a fuel use comprises:
identifying the actual fuel efficiency of the aircraft using the data about the components for the aircraft identified during the flight of the aircraft and the model of the aircraft, wherein the model of the aircraft identifies the fuel use.

9. The method of claim 1, wherein the step of managing the aircraft using the actual fuel efficiency identified for the aircraft comprises:
identifying whether maintenance is needed based on the actual fuel efficiency identified for the aircraft.

10. The method of claim 9, wherein the step of identifying whether the maintenance is needed based on the actual fuel efficiency identified for the aircraft comprises:
identifying fuel efficiency indices for the components;
comparing the fuel efficiency indices for the components with expected fuel efficiency indices for the components to form a comparison; and
responsive to a particular fuel efficiency index in the fuel efficiency indices for a component varying from a corresponding fuel efficiency index in the fuel efficiency indices for the component, indicating the maintenance is needed for the component.

11. The method of claim 1, wherein the data is about at least one of environmental factors, aircraft factors, and mission factors.

12. An apparatus comprising:
a computer system;
a program code configured to run on the computer system to:
identify an actual fuel efficiency of an aircraft during a mission based upon an adjustment to a model of the aircraft, the adjustment being based upon data about components for the aircraft during the mission, such that the model of the aircraft identifies predicted fuel use and the actual fuel efficiency is substantially continuously updated in real-time;
manage the aircraft during the mission based upon the actual fuel efficiency;
display an estimated amount of fuel left during flight of the aircraft based upon the actual fuel efficiency; and
identify the actual fuel efficiency on a graphical user interface based upon the data-about components for the aircraft and the model of the aircraft in response to an event during the mission.

13. The apparatus of claim 12 further comprising:
a sensor system associated with the aircraft, wherein the sensor system is configured to generate the data about the components for the aircraft.

14. The apparatus of claim 12, further comprising the program code being configured to identify an amount of fuel needed by the aircraft for the mission.

15. The apparatus of claim 14, further comprising the program code configured to transfer the amount of fuel identified as being needed by the aircraft for the mission into a number of fuel tanks in the aircraft.

16. The apparatus of claim 12, further comprising the program code configured to display an indication of the estimated amount of fuel remaining at an end of the mission and a control on the graphical user interface on a display device; and identify a new estimated amount of fuel remaining at the end of the mission in response to receiving an input manipulating the control to change a parameter for fuel usage.

17. The apparatus of claim 12, further comprising the program code configured to: identify the data about the components for the aircraft during flight of the aircraft; identify the actual fuel efficiency of the aircraft using the data about the components for the aircraft and the model of the aircraft, wherein the model of the aircraft identifies a fuel use; and identify the actual fuel efficiency of the aircraft using the data about the components for the aircraft identified during the flight of the aircraft and the model of the aircraft, wherein the model of the aircraft identifies the fuel use.

18. The method of claim 1, further comprising determining, using the actual fuel efficiency: an amount of fuel to transfer into a fuel tank on the aircraft based upon a plan for reserve fuel for the aircraft, and a need to change at least one of: a weight, a speed, a fuel load, and an altitude, of the aircraft during the mission.

19. An apparatus comprising:
a computer system;
a program code configured to run on the computer system to:
receive a change to a parameter of fuel usage and identify an actual fuel efficiency of an aircraft, during a mission, based upon: the parameter and an adjustment to a model of the aircraft, the model based upon data about components for the aircraft, such that the model of the aircraft identifies predicted fuel use, and the actual fuel efficiency is substantially continuously updated in real-time;
manage a flight setting of the aircraft during the mission using the actual fuel efficiency;
display an estimated amount of fuel left during flight of the aircraft based upon the actual fuel efficiency; and
identify the actual fuel efficiency on a graphical user interface in response to an event during the mission.

20. The apparatus of claim 19, the program code configured to manage the flight setting of the aircraft during the mission further comprising being configured to determine a need to change at least one of: a weight, a speed, a fuel load, and an altitude, of the aircraft during the mission, and determine a new estimate for reserve fuel remaining for the aircraft.

* * * * *